Patented Aug. 2, 1927.

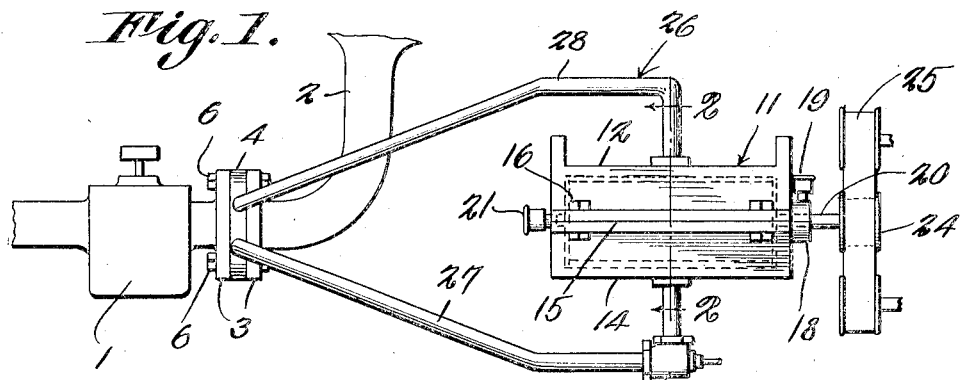
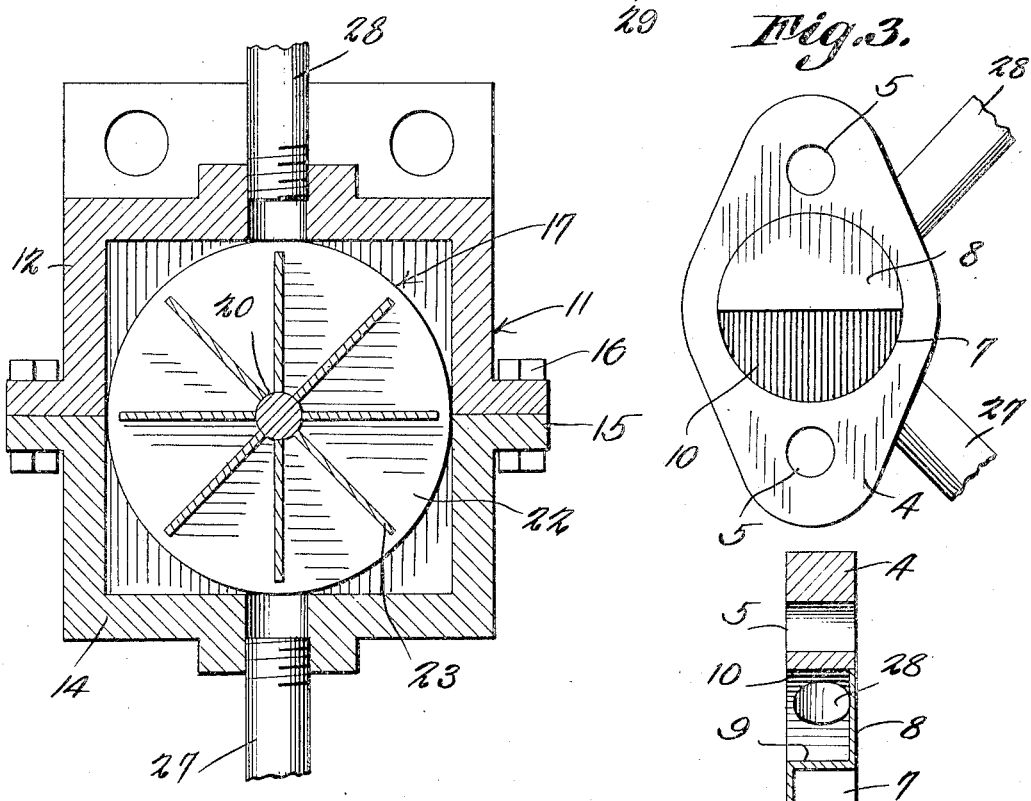

1,637,455

UNITED STATES PATENT OFFICE.

CHARLES POWELL, OF PUEBLO, COLORADO.

ATTACHMENT FOR CARBURETORS.

Application filed December 29, 1925. Serial No. 78,171.

This invention aims to provide novel means whereby a mixture of gas and air, proceeding from a carburetor, will be thoroughly mixed before it returns into the intake manifold of the engine.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in elevation, a device constructed in accordance with the invention;

Figure 2 is a section on the line 2—2 of Figure 1;

Figure 3 is a plan of the gasket;

Figure 4 is a sectional view showing the gasket.

The numeral 1 marks a carburetor. The intake manifold of an internal combustion engine is shown at 2. The carburetor 1 and the manifold 2 have flanges 3. A gasket 4 is disposed between the flanges 3. The gasket 4 has openings 5. Securing elements 6 pass through the openings 5. The securing elements 6 are mounted in the flanges 3. The gasket 4 has a central opening 7. A partition 8 extends across the opening 7. The partition 8 is off-set intermediate its ends, as at 9, to form approximately semicircular pockets 10 on each side of the part 9 of the partition 8.

The numeral 11 designates a casing made up, if desired, of an upper member 12 and a lower member 14 having outstanding ribs 15 connected by bolts 16 or the like, the casing being so built, in order that a rotor 17, hereinafter described, may be mounted conveniently in the casing 11. The members 12 and 14 of the casing 11 have cooperating parts which form a bearing 18 lubricated by a dope cup 19. In the bearing 18 is journaled a shaft 20. The shaft 20 is also journaled in the opposite end of the casing 11, and the last-specified end of the shaft is lubricated by means of a dope cup 21. The shaft 20 carries the rotor 17, hereinbefore mentioned. The rotor may be made in any desired way. It may consist of end plates 22 connected by any desired number of blades 23, disposed radially or otherwise, with respect to the shaft 20. Any suitable means may be provided for rotating the shaft 20. For instance, it may be equipped with a pulley 24 adapted to cooperate with the fan belt 25 of the engine.

The numeral 26 indicates a loop-shaped conduit wherein the gasket 4 and the casing 11 are interposed, the said conduit including a pipe 27 communicating with one of the pockets 10 and with the casing 11 on one side of the rotor 17, the loop-shaped conduit including a pipe 28 communicating with the other of the pockets 10 and with the casing 11 on the other side of the rotor. A check valve 29 may be interposed in the pipe 27.

In practical operation, when the rotor 17 is turned, the mixture is drawn through the pipe 27 from that side of the partition 8 which is adjacent to the carburetor 1. The mixture is agitated thoroughly by the rotor 17 and is forced out through the pipe 28 on the opposite side of the partition 8, and, from the partition 8, the mixture proceeds to the intake manifold 2.

What is claimed is:—

In a device of the class described, a gasket and means for mounting the gasket in the fuel intake line of an internal combustion engine, a loop-shaped conduit opening through the gasket at spaced points, a power-driven rotary mixing device in the conduit, and an imperforate partition disposed in the gasket between said points, the partition constituting means for deflecting the whole fuel charge from one side of the partition, through the conduit, to the mixer, and back to the opposite side of the partition.

In testimony that I claim the foregoing as my own, I have hereto affixed my signature.

CHARLES POWELL.